(12) United States Patent
Schwartz

(10) Patent No.: US 7,105,585 B2
(45) Date of Patent: Sep. 12, 2006

(54) UV CURE INK JET INK FOR NONPOROUS SUBSTRATES

(75) Inventor: Nathaniel R. Schwartz, Newark, DE (US)

(73) Assignee: Flint Ink Corporation, Ann Arbor, MI (US)

( * ) Notice: Subject to any disclaimer, the term of this patent is extended or adjusted under 35 U.S.C. 154(b) by 0 days.

(21) Appl. No.: 10/944,943

(22) Filed: Sep. 20, 2004

(65) Prior Publication Data

US 2005/0146586 A1 Jul. 7, 2005

Related U.S. Application Data

(60) Provisional application No. 60/506,090, filed on Sep. 25, 2003.

(51) Int. Cl.
*C08F 2/46* (2006.01)
(52) U.S. Cl. .................. 522/172; 522/71; 522/99; 522/148; 106/31.13; 106/31.28; 106/106
(58) Field of Classification Search ............... 522/71, 522/99, 148, 172; 106/31.13, 31.28, 160
See application file for complete search history.

(56) References Cited

U.S. PATENT DOCUMENTS 5,656,071 A   8/1997   Kappele et al.
5,852,075 A * 12/1998  Held ........................ 523/161
6,124,376 A   9/2000   Nichols et al.
6,593,390 B1 * 7/2003  Johnson et al. ............ 522/74

FOREIGN PATENT DOCUMENTS

WO   WO990029787   *  6/1999

OTHER PUBLICATIONS

BYK-Chemie: Additive Guide. Datasheet [online]. BYK-Chemie [retrieved on May 2006-]. Retrieved from the Internet: <URL: http://www.byk-chemie.com/gbn/frame.cfm?idx=21.html>. pp. 1-8.*

* cited by examiner

*Primary Examiner*—Sanza L. McClendon
(74) *Attorney, Agent, or Firm*—Harness, Dickey & Pierce, P.L.C.

(57) ABSTRACT

A radiation-curable ink jet ink free of unreactive volatile organic compounds and comprising an alkyl (meth)acrylate in which the alkyl group has at least 8 carbon atoms, a poly(alkylene oxide) modified poly(dimethyl siloxane), further radiation curable material, and a pigment can be printed on nonporous substrates, particularly plastic substrates such as vinyl substrates, with good dot gain and appearance.

7 Claims, No Drawings

UV CURE INK JET INK FOR NONPOROUS SUBSTRATES

FIELD OF THE INVENTION

The invention relates to ink jet inks and methods of ink jet printing.

BACKGROUND OF THE INVENTION

Ink jet inks must have a very low viscosity, typically less than about 20 centipoise at the jetting temperature. While hot melt inks have been used, liquid inks are generally more suited to high volume industrial printing. One way to achieve this low viscosity is by including a substantial amount of organic liquids. In general, ink containing a substantial amount of organic liquids would produce undesirable emissions during the printing process. Such emissions are substantially avoided, however, with energy curable inks. Energy curable inks use low viscosity reactive materials to attain the desired viscosity. The reactive materials have reactive groups that are cured after printing with radiation, such as UV radiation or electron beams.

The low viscosity reactive materials in energy curable inks may include low viscosity monomers and low viscosity oligomers. The energy curable inks may also include higher viscosity reactive and unreactive oligomers and polymers. Because monofunctional monomers are particularly low in viscosity, ink jet inks to date have included substantial amounts of monofunctional monomers. On the other hand, monofunctional monomers are in general the most volatile of the reactive materials that might be included, resulting in some evaporation and undesirable emissions during the printing process. It would, therefore, be desirable to omit or limit the most volatile monofunctional monomers.

It would also be desirable to formulate and ink jet ink that would print well onto plastic substrates.

SUMMARY OF THE INVENTION

The present invention provides a radiation-curable ink jet ink free of unreactive volatile organic compounds, the ink comprising an alkyl (meth)acrylate in which the alkyl group has at least 8 carbon atoms and is preferably branched, a poly(alkylene oxide) modified poly(dimethyl siloxane), further radiation curable material, and a pigment. The term (meth)acrylate is used to encompass both "acrylate" and "methacrylate." The further radiation curable material may include reactive monomers, particularly polyfunctional reactive monomers, and reactive oligomers. To be ink jettable, the ink must have a viscosity, depending on the printhead and printhead temperature, of about 8 to about 40 centipoise.

The ink of the invention has excellent printing properties, including producing a high quality image with optimal dot gain such that print detail is excellent and unwanted white area is minimized.

In another embodiment, the invention provides an ink jet ink that includes a pigment, an alkyl (meth)acrylate in which the alkyl group has at least 8 carbon atoms and is preferably branched, a poly(alkylene oxide) modified poly(dimethyl siloxane), a reactive oligomer, and di-functional and/or higher functionality reactive monomers. The ink may also contain a photoinitiator when the radiation used to cure the ink will be ultraviolet light. The ink is also advantageous in printing on vinyl substrates and other plastic substrates.

The invention further provides an ink jet printing method in which an ink jet printer prints the ink jet ink of the invention onto a substrate. The printing method avoids release of volatile organic compounds.

"A" and "an" as used herein indicate "at least one" of the item is present; a plurality of such items may be present, unless the context clearly dictates otherwise. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

The energy curable ink jet ink includes an alkyl (meth)acrylate in which the alkyl group has at least 8 carbon atoms and is preferably branched, a poly(alkylene oxide) modified poly(dimethyl siloxane), a reactive oligomer, and a pigment.

Preferred alkyl (meth)acrylates are those that have a surface tension in the range from about 28 to about 29 dynes/cm and a viscosity in the range from about 5 to about 7 centipoise. Examples of suitable alkyl (meth)acrylates include, without limitation, isodecyl acrylate, isodecyl methacrylate, isooctyl acrylate, tridecyl acrylate, tridecyl methacrylate, and combinations of these. Preferred among these is isodecyl acrylate.

The ink may contain up to about 20% by weight of the alkyl (meth)acrylate or alkyl (meth)acrylates, preferably from about 10% to about 19.9% by weight of the alkyl (meth)acrylate or alkyl (meth)acrylates, more preferably from about 10% to about 19.5% by weight of the alkyl (meth)acrylate or alkyl (meth)acrylates.

The ink further contains a poly(alkylene oxide) modified poly(dimethyl siloxane). One suitable poly(alkylene oxide) modified poly(dimethyl siloxane) is available from Byk Chemie under the designation Byk 348. The ink may contain up to about 1.0% by weight of the poly(alkylene oxide) modified poly(dimethyl siloxane), preferably from about 0.2% to about 0.8% by weight of the poly(alkylene oxide) modified poly(dimethyl siloxane), more preferably from about 0.2% to about 0.5% by weight of the poly(alkylene oxide) modified poly(dimethyl siloxane).

The ink further includes a reactive oligomer. Examples of suitable reactive oligomers include, without limitation, oligomers having at least one, preferably more than one, ethylenically unsaturated double bonds, such as acrylated epoxy oligomers, acrylated polyurethane oligomers, acrylated polyesters, and combinations of these. Preferred oligomers have average functionality of from about 1.6 to about 2.0. It is also preferred to use oligomers having molecular weight between about 300 and about 500. The ink may contain up to about 6.0% by weight of the reactive oligomer, preferably from about 2.0% to about 5.0% by weight of the reactive oligomer, more preferably from about 2.5% to about 4.0% by weight of the reactive oligomer.

The ink may further include polyfunctional monomers, such as alkylenediol di(meth)acrylates such as 1,6-hexanediol diacrylate and neopentyl glycol diacrylate, cyclohexanedimethanol diacrylate, polyalkylene glycol di(meth)

acrylates such as triethylene glycol diacrylate, ether modified monomers such as propoxylated neopentyl glycol diacrylate, and higher functionality monomers such as trimethylolpropane triacrylate, trimethylolethane triacrylate, and pentaerythritol tetracrylate, and so on, as well as combinations of such polyfunctional monomers.

The pigment or pigments in the ink may be any of those suitable for ink jet inks. In general, pigments for ink jet inks have a maximum particle size that is small enough to avoid clogging the ink jets during printing. The pigments preferably have a narrow particle size distribution. Among those that may be mentioned are C.I. Pigment Yellow 93, 95, 109, 110, 120, 128, 138, 139, 151, 154, 155, 173, 180, 185 and 193; C.I. Pigment Orange 34, 36, 43, 61, 63 and 71; C.I. Pigment Red 122, 202, 254, and a solid solution of C.I. Pigment Red 122 and 202; C.I. Pigment Blue 15:3 and 15:4; C.I. Pigment Violet 19, 23 and 33; C.I. Pigment Black 7. The ink jet inks are preferably used in a set that provides for full-color printing of images. In one preferred embodiment, an ink set including cyan, magenta, yellow, and black (CMYK) inks is used. For example, yellow, C.I. Pigment Yellow 138, 151, 154, 180 and 185 may be used in the yellow ink; C.I. Pigment Red 122 and 202, 254, and C.I. Pigment Violet 19 may be used in the magenta ink; C.I. Pigment Blue 15 may be used in the cyan ink; and an acidic or neutral pigment of C.I. Pigment Black 7 may be used in the black ink.

The pigments may be provided with a surface treatment to aid in dispersing the pigment and/or in stabilizing the dispersion of the pigment. In general, no separate dispersants are needed. In particular, surfactants and dispersants should not be included at levels that affect the surface tension of the ink, as changing the surface tension of ink may adversely affect the quality of the print by making it difficult to control drop spread. In other cases it may be advantageous to include a modest amount of a dispersant, for example to use a solution of a high molecular weight block copolymer as a stabilizing agent with yellow pigments.

The amount of pigment included in the ink will depend on, for example, which pigment is used. In general, the ink jet ink contains from about 0.5 to about 15% by weight of pigment. While a sufficient amount of pigment is included to attain the desired color density of the ink, including more pigment also tends to increase viscosity. Suitable pigments are available, for example and without limitation, from Clariant Corporation of Coventry, Rhode Island and Ciba Specialty Chemicals Corp. of Basel, Switzerland.

Before being added to the ink, the pigment is first dispersed in one or more of the radiation curable components of the ink and/or a pigment dispersant compound. Preferably, the pigment is dispersed in a mixture of reactive monomer, reactive oligomer, and, optionally, a pigment dispersant. The dispersion may be made using typical pigment milling techniques and equipment.

The energy curable ink jet ink may further include a photoinitiator. Examples of suitable photoinitiators include, without limitation, benzoin ethers such as benzoin methyl ether, benzoin ethyl ether, benzoin phenyl ether, and so on; alkylbenzoins such as methylbenzoin, ethylbenzoin, and so on; benzyl derivatives including benzyldimethylketal; 2,4,5-triarylimidazole dimers including 2-(o-chlorophenyl)-4,5-diphenylimidazole dimer, 2-(o-chlorophenyl) -4,5-di(m-methoxyphenyl)imidazole dimer, 2-(o-fluorophenyl) -4,5-phenylimidazole dimer, 2-(o-methoxyphenyl)-4,5-diphenylimidazole dimer, 2-(p-methoxyphenyl)-4,5-diphenylimidazole dimer, 2,4-di(p-methoxyphenyl) -5-phenylimidazole dimer, 2-(2,4-dimethoxyphenyl)-4,5-diphenylimidazole dimer, and so on; acridine derivatives such as 9-phenylacridine and 1,7-bis (9,9'-acridinyl)heptane; N-phenylglycine; aromatic ketones such as trimethylbenzophenone, isopropylthioxanthone, benzophenone, 2-chloro and 2-ethyl-thioxanthone, 2,2-dimethoxy-2-phenylacetophenone, 2,2-diethoxyacetophenone, 2-hydroxy-2-methyl-1-phenyl-propanone, oligo-[2-hydroxy-2-methyl-1-[4-(1-methylvinyl)phenyl]propanone, 1-hydroxycyclohexyl-acetophenone, and 2-ethyl-hydroquinone; phosphine oxides, such as 2,4,6-trimethylbenzoyldiphenylphosphine oxide, and combinations of these. Commercial photoinitiators are available, for example, from Ciba (based in Switzerland) and Lamberti (based in Italy).

The ink may further include suitable additives, such as dyes, and/or plasticizers. If the ink is formulated as a CIJ (continuous ink jet) ink, then an electrolyte is added to the ink. The ink jet ink may contain a small amount of absorbed water, but water is not a substantial component of the solvent package and the ink is nonaqueous.

The ink of the invention may be prepared by blending one or more pigment dispersions, the alkyl (meth)acrylate in which the alkyl group has at least 8 carbon atoms and is preferably branched, the poly(alkylene oxide) modified poly (dimethyl siloxane), the further radiation curable material, and any further additive(s).

The ink of the invention may be printed with drop-on-demand (impulse) ink jet printers, valve-jet printers, or, if an electrolyte is included and the ink viscosity adjusted appropriately, with continuous stream ink jet printers. In continuous stream ink jet systems, ink is emitted in a continuous stream under pressure through at least one orifice or nozzle. The stream is perturbed by a piezoelectric transducer, causing it to break up into droplets at a fixed distance from the orifice. At this break-up point, the droplets are charged according to digital data signals. These droplets then pass through an electrostatic field that adjusts the trajectory of each drop, directing the drop either to a specific location on the substrate or back to a gutter for recirculation. In drop-on-demand ink jet printers, a droplet is expelled under pressure from the print head directly to a position on the substrate according to digital data signals. The droplet is formed and expelled only when it is to be jetted onto the substrate.

A full-color image can be printed with an ink jet printer employing an ink set of the invention, such as cyan, magenta, yellow, and black inks (CMYK). The inks of the invention may be formulated in other or in additional colors to make a desired ink set for full-color printing.

The ink of the invention unexpectedly offers exceptional print properties on plastic and other nonporous substrates, particularly vinyl substrates.

The invention is illustrated by the following examples. The examples are merely illustrative and do not in any way limit the scope of the invention as described and claimed. All parts are parts by weight unless otherwise noted.

EXAMPLES

Example 1

Ink Jet Ink According to the Invention

A mixture of 33.7 parts by weight of propoxylated neopentyl glycol diacrylate, 26.5 parts by weight of 1,6-hexanediol diacrylate, 19 parts by weight of isodecyl acrylate, 3.0 parts by weight Byk 348 solution (10% by weight Byk 348, an ether modified polydimethyl siloxane, in propoxylated neopentyl glycol diacrylate), 6.5 parts by weight of a cyan pigment base (35.7% by weight Pigment 15:4 dispersed in a mixture of a pigment dispersant and an epoxy acrylate oligomer), and 14.0 parts by weight of a photoinitiator package were combined and mixed with a high shear disperser 60 minutes. The ink had a viscosity of 13.2 centipoise at 25° C. and a surface tension of 31.2 dynes/cm.

Comparative Example A

Comparison Ink Jet Ink

A mixture of 79.5 parts by weight of 1,6-hexanediol diacrylate, 6.5 parts by weight of the cyan pigment base of Example 1, and 14.0 parts by weight of the photoinitiator package of Example 1 were combined and mixed with a high shear disperser 60 minutes. The ink had a viscosity of about 13 centipoise at 25° C. and a surface tension of 32.99 dynes/cm.

Comparative Example B

Comparison Ink Jet Ink

A mixture of 32.0 parts by weight of propoxylated neopentyl glycol diacrylate, 27.5 parts by weight of 1,6-hexanediol diacrylate, 20 parts by weight of isodecyl acrylate, 6.5 parts by weight of the cyan pigment base of Example 1, and 14.0 parts by weight of the photoinitiator package of Example 1 were combined and mixed with a high shear disperser 60 minutes. The ink had a viscosity of about 13 centipoise at 25° C. and a surface tension of 31.52 dynes/cm.

The inks of Example 1, Comparative Example A, and Comparative Example B were printed on Avery SP vinyl substrate using an ink jet printer. The printed ink was cured with a 35-Hz Xenon flash lamp and the quality of the print was observed. The appearances of the prints from Comparative Example A and Comparative Example B were not acceptable. The ink of Comparative Example A pooled and did not wet the surface of the vinyl substrate, producing a cratered look and inconsistent color density. The appearance of the ink of Comparative Example B was much improved over that of Comparative Example A, but still had a cratered surface over the vinyl substrate. The appearance of the ink of Example 1 was excellent, with good dot spread and excellent color development.

Comparative Example C

Comparison Ink Jet Ink

An ink was prepared according to Example 1, except that the BYK 348 was replaced with a crosslinkable silicone acrylate (TEGO® Rad 2100 from Tego Chemie). The ink was tested as above. The ink of Example C had a poor appearance over the vinyl substrate.

Comparative Example D

Comparison Ink Jet Ink

An ink was prepared according to Example 1, except that the BYK 348 was replaced with a fluorosurfactant (ZONYL® FSO available from DuPont). The ink was tested as above. The ink of Example D had a poor appearance over the vinyl substrate.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A radiation-curable ink jet ink, comprising
   an alkyl (meth)acrylate in which the alkyl group is linear or branched and has at least 8 carbon atoms, wherein the alkyl(meth)acrylate is present in an amount up to about 20% by weight,
   from about 0.2% to about 1.0% by weight of a poly (alkylene oxide) modified poly(dimethyl siloxane),
   further radiation curable material, and
   a pigment, wherein the radiation-curable ink jet ink composition is free of unreactive volatile organic compounds.

2. A radiation-curable ink jet ink according to claim 1, wherein the alkyl group of the alkyl (meth)acrylate is branched.

3. A radiation-curable ink jet ink according to claim 1, wherein the alkyl (meth)acrylate comprises isodecyl acrylate.

4. A radiation-curable ink jet ink according to claim 1, wherein the further radiation curable material comprises a diacrylate.

5. A radiation-curable ink jet ink according to claim 4, wherein the diacrylate is selected from the group consisting of alkylene diol diacrylates, propoxylated alkylene glycol diacrylates, and combinations thereof.

6. A method of printing a nonporous substrate, comprising a step of ink jet printing the ink of claim 1 onto the nonporous substrate.

7. A method according to claim 6, wherein the substrate is a vinyl substrate.

* * * * *